(12) United States Patent
Chen et al.

(10) Patent No.: US 10,520,662 B1
(45) Date of Patent: Dec. 31, 2019

(54) DISPLAY APPARATUS AND ASSEMBLY METHOD THEREOF

(71) Applicant: XIAMEN TIANMA MICRO-ELECTRONICS CO., LTD., Xiamen (CN)

(72) Inventors: Xing Chen, Xiamen (CN); Yaowu Hong, Xiamen (CN); Wei Lin, Xiamen (CN); Shanxiu Wang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/284,006

(22) Filed: Feb. 25, 2019

(30) Foreign Application Priority Data

Dec. 25, 2018 (CN) .......................... 2018 1 1594483

(51) Int. Cl.
*G02B 6/00* (2006.01)
*F21V 8/00* (2006.01)

(52) U.S. Cl.
CPC ......... *G02B 6/0053* (2013.01); *G02B 6/0051* (2013.01); *G02B 6/0088* (2013.01)

(58) Field of Classification Search
CPC ... G02B 6/0053; G02B 6/0051; G02B 6/0088
See application file for complete search history.

(56) References Cited

U.S. PATENT DOCUMENTS

| 9,874,683 B2* | 1/2018 | Li | G02F 1/133608 |
| 2009/0079896 A1* | 3/2009 | Hayashi | G02F 1/1303 349/58 |
| 2009/0290089 A1* | 11/2009 | Ichioka | G02F 1/133308 349/58 |
| 2012/0050648 A1* | 3/2012 | Jang | G02B 6/009 349/65 |
| 2012/0293728 A1* | 11/2012 | Yokohama | G02B 6/0088 348/739 |
| 2013/0322118 A1* | 12/2013 | Kuo | G02F 1/133308 362/611 |
| 2014/0022488 A1* | 1/2014 | Yu | G02F 1/133308 349/60 |

FOREIGN PATENT DOCUMENTS

CN 108540603 A 9/2018

* cited by examiner

*Primary Examiner* — Anne M Hines
(74) *Attorney, Agent, or Firm* — Anova Law Group PLLC

(57) ABSTRACT

A display apparatus and an assembly method of a display apparatus are provided. An exemplary display apparatus includes a cover plate; a display film module disposed on one side of the cover plate and containing a first through hole; a backlight module containing a second through hole, wherein an orthogonal projection of the first through hole on the cover plate at least partially overlaps with an orthogonal projection of the second through hole on the cover plate; and a function module, wherein the function module sequentially includes a first portion disposed in the first through hole, a second portion disposed in the second through hole and a third portion, the third portion forms a first step, the backlight member is disposed on the first step, and a sidewall surface of the second portion forms an inner support structure surrounding the inner end surface of the second through hole.

20 Claims, 13 Drawing Sheets

DISPLAY APPARATUS AND ASSEMBLY METHOD THEREOF

CROSS-REFERENCES TO RELATED APPLICATIONS

This application claims priority of Chinese Patent Application No. 201811594483.7, filed on Dec. 25, 2018, the entire contents of which are hereby incorporated by reference.

FIELD OF THE DISCLOSURE

The present disclosure generally relates to the field of display technology and, more particularly, relates to a display apparatus and an assembly method of a display apparatus.

BACKGROUND

Electronic devices with display panels have been widely used in all aspects of life and work. In various electronic devices, especially in mobile terminal products, to meet the user's requirements for the display area, in the design of the bezel of the display panel, the bezel has been continuously reduced to pursue a higher screen-to-body ratio. One approach to increase the screen-to-body ratio is to use the special-shaped display panel. For example, as the mobile phone continues to be developed in the direction of full screen, a technical solution for placing a through-hole in the display area and placing components, such as a camera, in the through-hole has been developed. However, after forming the through hole in the display area, the light leakage easily occurs at the through hole.

Therefore, there is a need to develop a display panel and an assembly method to solve the issues related to forming the through-hole in the display area, in particular, to reduce the risk of the light leakage at through hole. The disclosed display apparatus and assembly method are directed to solve one or more problems set forth above and other problems in the art.

BRIEF SUMMARY OF THE DISCLOSURE

One aspect of the present disclosure provides a display apparatus. The display apparatus may include a cover plate; and a display film module, along a first direction, disposed on one side of the cover plate and containing a first through hole; a backlight module, disposed on a side of the display film module away from the cover plate, wherein the backlight module includes a backlight member, the backlight member contains a second through hole, the backlight member includes an inner end surface that forms a sidewall surface of the second through hole and an outer end surface away from the second through hole, and an orthogonal projection of the first through hole on the cover plate is referred to as a first projection and an orthogonal projection of the second through hole on the cover plate is referred to as a second projection, and the first projection is at least partially overlaps with the second projection; and a function module, wherein, along the first direction, the function module sequentially includes a first portion disposed in the first through hole, a second portion disposed in the second through hole and a third portion, and along a second direction substantially perpendicular to the first direction, the third portion extends outwardly relative to the second portion to form a first step, the backlight member is disposed on the first step, and a sidewall surface of the second portion adapts to the inner end surface to form an inner support structure surrounding the inner end surface.

Another aspect of the present disclosure provides an assembly method of a display apparatus. The method may include providing a function module. Along a first direction, the function module may sequentially include a first portion, a second portion and a third portion and; and along a second direction substantially perpendicular to the first direction, the third portion may extend outwardly to form a first step. The method may also include assembling a backlight module on the first step of the function module. The backlight module may include a backlight member. The backlight member may include a plurality of layers. Each of the plurality of layers may include a through hole. Each layer may hitch around the second portion through its through hole to enable the backlight member to form a second through hole for accommodating the second portion. The backlight member may include an inner end surface that forms a sidewall surface of the second through hole and an outer end surface away from the second through hole; and a sidewall surface of the second portion may form an inner support structure surrounding the inner end surface. Further, the method may include providing a display film module having a first through hole; hitching the display film module around the first portion of the display film module through the first through hole; providing a cover plate; and disposing the cover plate on the display film module to cover the display film module and the function module.

Other aspects of the present disclosure can be understood by those skilled in the art in light of the description, the claims, and the drawings of the present disclosure.

BRIEF DESCRIPTION OF THE DRAWINGS

The following drawings are incorporated in and constitute a part of the specification, illustrating embodiments of the present disclosure, and together with the detailed descriptions serve to explain the mechanism of the present disclosure.

DETAILED DESCRIPTION

Figure 1:
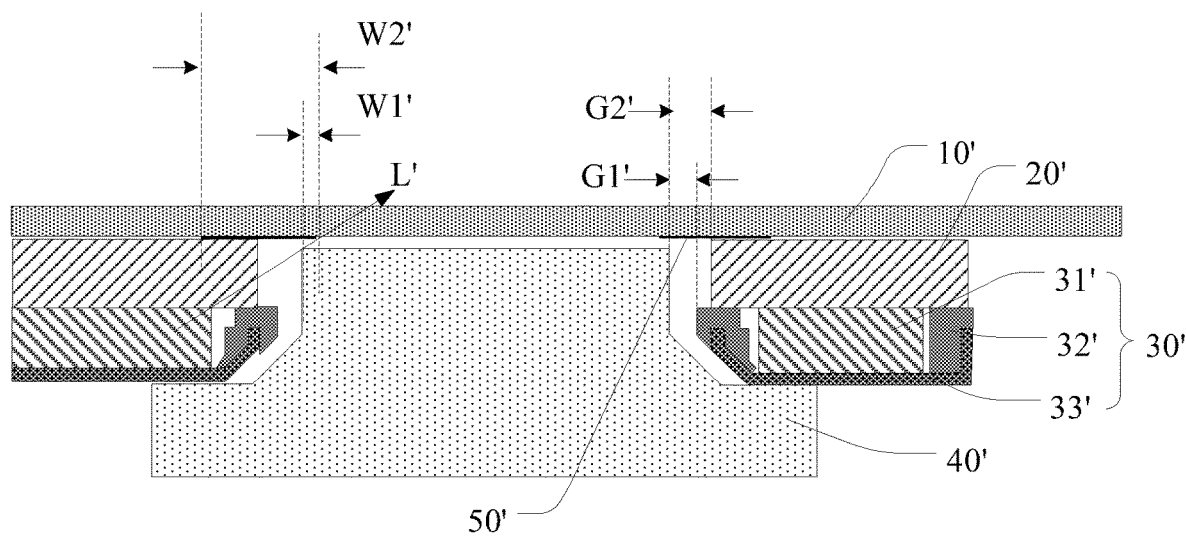
FIG. 1 illustrates a layer structure of a display apparatus.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all the embodiments of the present disclosure. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined when there are no conflicts.

Certain techniques, methods, and apparatus that are understandable to the persons of ordinary skill in the art may not be described in detail. However, under appropriate conditions, such techniques, methods and apparatus are also included as the parts of the description.

In the disclosed embodiments, specific values may be explained for illustrative purposes and might not be used as limitations. Thus, embodiments may have different specific values.

Further, the similar symbols and letters in the drawings may denote similar elements. Thus, once one element is defined in one drawing, it may not need to be defined in the following drawings.

FIG. 1 illustrates a layer structure of a display apparatus. As shown in FIG. 1, the display apparatus includes a cover plate 10', a display film module 20', a backlight module 30', and a camera module 40'. A through hole is disposed at a corresponding position of the display film module 20' and the backlight module 30'; and the camera module 40' is installed in the through hole. The backlight module 30' includes a backlight member 31'. The backlight member 31' includes a plurality of layers. Based on the assembly stability requirement of the backlight module 30', it is required to provide a support structure at both ends of the backlight element 31'. In one technique, the support structure includes a back frame 33' and an adhesive frame 32'. The adhesive frame 32' includes two portions. One portion is disposed around the outer end edge of the backlight member 31'; and the other portion surrounds the inner end edge at the position of the through hole. The back frame 33' extends from the back of the backlight element 31' to the inner end and the outer end of the backlight element 31'; and is respectively fixed to the two portions of the adhesive frame 32'. Further, around the periphery region of the through hole, a light-shielding layer 50' is formed on the surface of the cover plate 10' adjacent to the display film module 20'.

The camera module 40' is often mounted in the through hole after the display film module 20' is assembled with the backlight module 30' to form a display module. Based on the requirements of the assembly process, at least a first gap G1 needs to be left between the camera module 40 and the sidewall surface of the through hole of the display module. In the backlight module 30', the adhesive frame 32' is used as a support structure and bonded with the back frame 33'. Thus, the backlight module 30' may protrude from the display film module 20'. Accordingly, after assembling the camera module 40' in the through hole, the camera module 40' has a second gap G2' with the sidewall surface of the through hole of the display film module 20'; and G2'>G1'.

On the one hand, to prevent the light from emitting through the second gap G2' at the edge of the camera module 40' to cause the light leakage at the through hole, the line width W1' of the camera module 40 covered by the light-shielding layer 50' is required to be as large as possible. On the other hand, to realize a narrow bezel, the overall line width W2' of the light-shielding layer 50' is often limited. Thus, the risk of the light leakage at the through hole where the camera module 40' is disposed may be increased.

The present disclosure provides a display apparatus and a method for assembling a display apparatus. In the display apparatus, a backlight module and a function module (such as a camera module) mounted at a through hole of the display apparatus may be structurally integrated. In particular, the sidewall surface of the function module may be designed as a structure adapting the inner end surface of the backlight module at the position of the through hole such that the sidewall surface of the function module may form an inner support structure surrounding the inner end surface of the backlight module. During the assembly process of the display apparatus, the function module and the plurality of layers of the backlight module may be sequentially assembled to form an integrated structure; and then the display film module may be assembled. Comparing with the prior arts, the disclosed display apparatus may not need to set an installation gap between the function module and the sidewall surface of the through hole of the display film module. In particular, the gap between the sidewall of the through hole of the display film module and the function module may be reduced such that the display film module may be closer to the function module. Thus, it may be equivalent to the increase the line width of the function module covered by the light-shielding layer; and the risk of the light leakage at the through hole may be reduced. Accordingly, the light leakage at the through hole may be reduced without changing the width of the bezel at the through hole.

Figure 2:
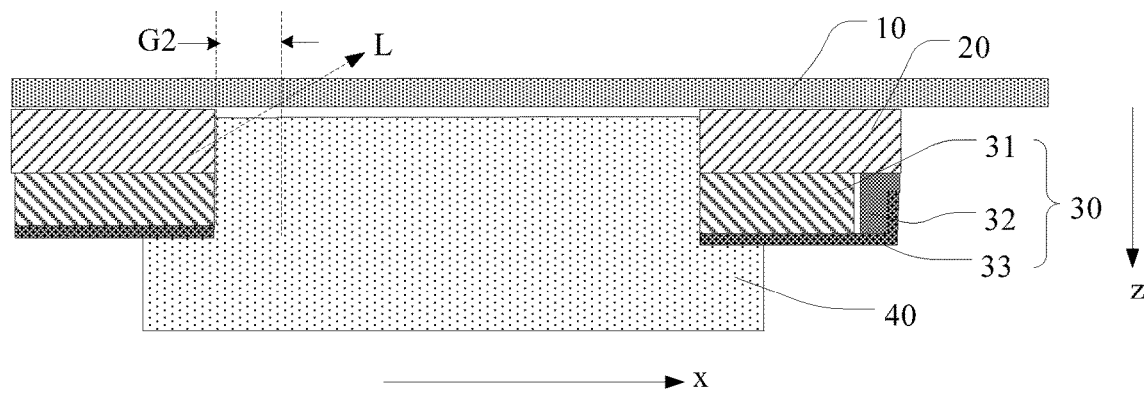
FIG. 2 illustrates a layer structure of an exemplary display apparatus consistent with various disclosed embodiments.
Figure 3:
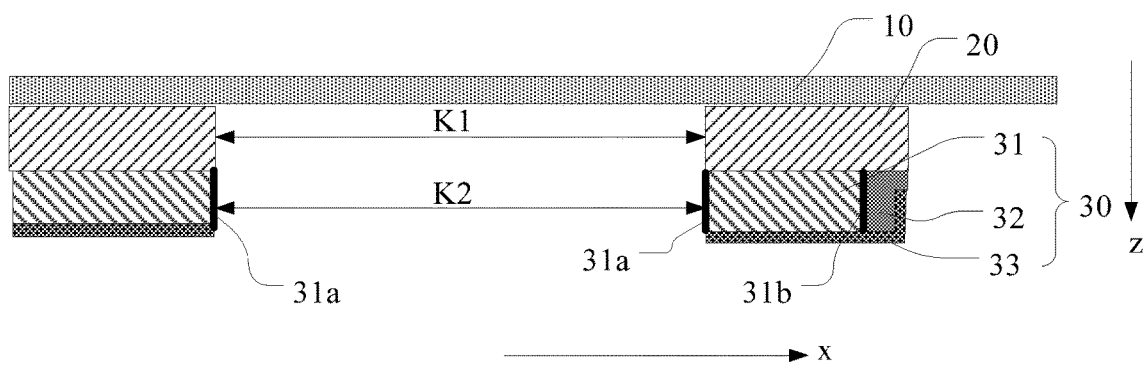
FIG. 3 illustrates a layer structure of an exemplary display apparatus without a function module consistent with various disclosed embodiments.
Figure 4:
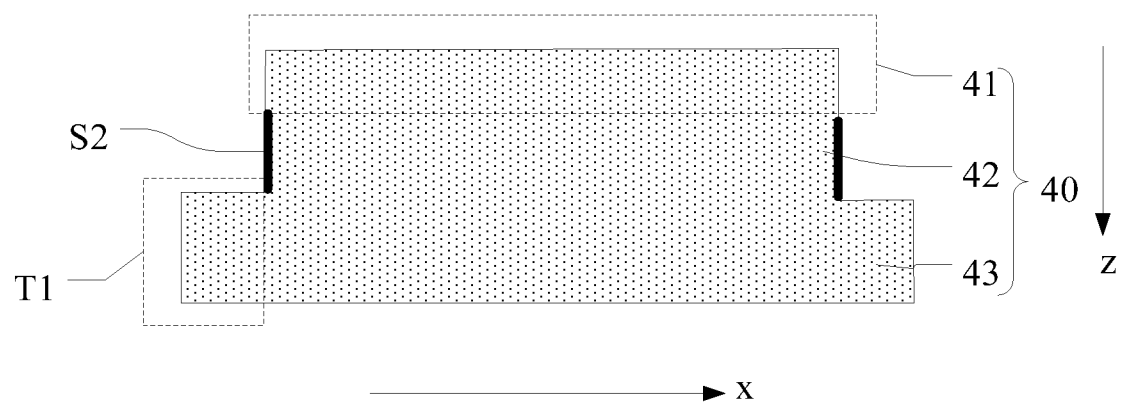
FIG. 4 illustrates a function module of an exemplary display apparatus consistent with various disclosed embodiments.
Figure 5:
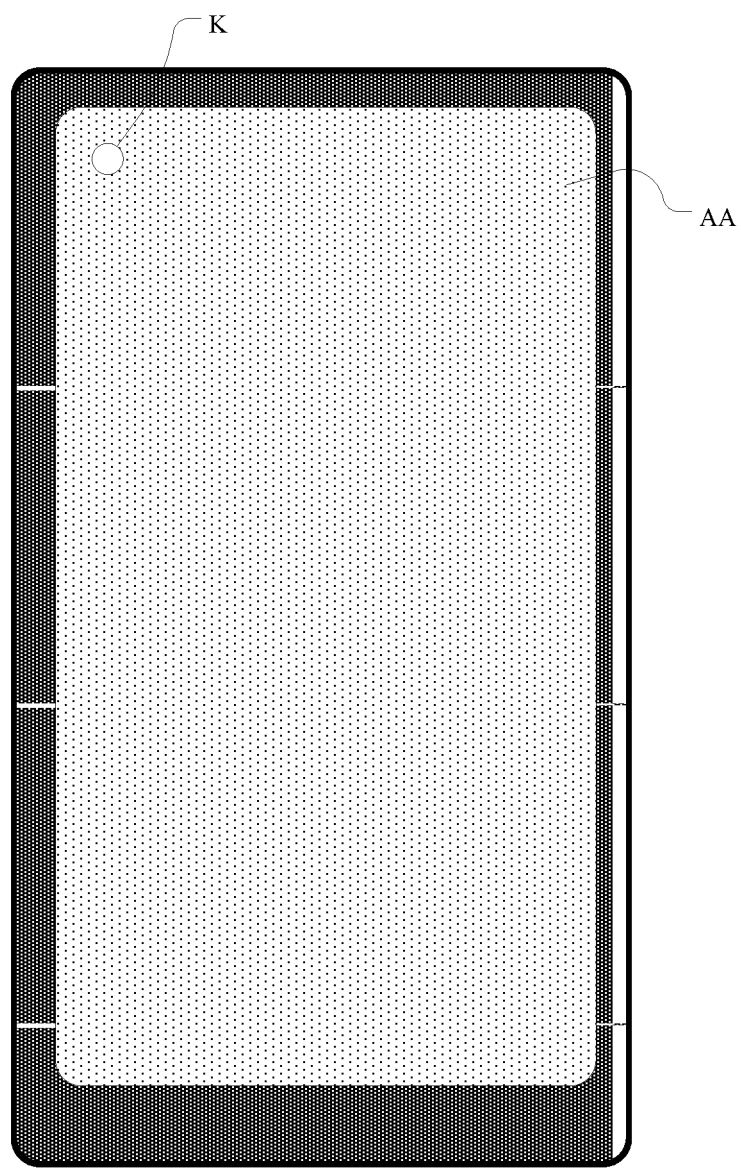
FIG. 5 illustrates a top view of an exemplary display apparatus consistent with various disclosed embodiments.

FIG. 2 illustrates a layer structure of an exemplary display apparatus consistent with various disclosed embodiments. FIG. 3 illustrates a layer structure of an exemplary display apparatus without a function module consistent with various disclosed embodiments. FIG. 4 illustrates a function module of an exemplary display apparatus consistent with various disclosed embodiments. FIG. 5 illustrates a top view of an exemplary display apparatus consistent with various disclosed embodiments.

In one embodiment, as shown in FIGS. 2-5, the display apparatus may include a cover plate 10, a display film module 20, a backlight module 30, and a function module 40.

In particular, along a first direction z, the display film module 20 may be disposed at one side of the cover plate 10. The display film module 20 may have a first through hole K1. The first through hole and the other through holes described in the present disclosure may all refer to as the holes along the thickness direction of the member in which the through holes are disposed. The display film module 20 may include film layer structures, such as a display panel and/or a polarizer, etc. The display panel may be a liquid crystal display (LCD) panel, etc.

Along the first direction z, the backlight module 30 may be disposed at the side of the display film module 20 away from the cover plate 10. The backlight module 30 may include a backlight member 31. The backlight member 31 may include a plurality of layers, such as a light guide plate, and optical layers, etc.

Along the first direction z, the function module 40 may sequentially include a first portion 41, a second portion 42 and a third portion 43. Along a second direction x, the third portion 43 may extend outwardly relative to the second portion 42 to form a first step T1. The second direction x may be perpendicular to the first direction z. The function module 40 may be a camera module, an earpiece module, and/or a sensor module, etc.

Each of the plurality of layers of the backlight member 31 may all have a through hole, and all the layers of the backlight member 31 may be assembled on the first step T1. In particular, the backlight member 31 may be disposed on the first step T1, and the assembly of the backlight member 31 and the function member 40 may be finished. After assembling other structures of the backlight module 30, an integrated structure formed by the backlight module 30 and the function module 40 may be obtained.

In the integrated structure, a second through hole K2 may be formed in the backlight member 31 such that the backlight member 31 may include an inner end surface 31a that forms the sidewall surface of the through hole and an outer end surface 31b away from the second through hole K2. The second portion 42 of the function module 40 may be disposed in the second through hole K2, and a side surface S2 of the second portion 42 may be adapt to the inner end surface 31a to form an inner support structure surrounding the inner end surface 31a of the backlight module 30.

For the outer support structure at the outer end surface 31b of the backlight module 30, an adhesive frame 32 or other structures may be used. The adhesive frame 32 may be further combined with a back frame 33 as an adhesive iron frame. Therefore, for the backlight module 30, the inner support structure on the inner end surface 31a around the second through hole K2 may be formed by the side surface S2 of the second portion 42 of the function module 40; and it may not need to form an extra inner support structure separately.

The first through hole K1 may be formed during the process for forming the display film module 20; and then assembled with the integrated structure formed by the backlight module 30 and the function module 40. By doing so, the first portion 41 may be disposed in the first through hole K1. Then, the cover plate 50 may be assembled. After the assembly is completed, the orthographic projection of the first through hole K1 on the cover plate 10 may be referred to as a first projection; and the orthographic projection of the second through hole K2 on the cover plate 10 may be referred to as a second projection. The first projection and the second projection may at least partially overlap such that the first through hole K1 and the second through hole K2 may at least be partially connected through. Further, as shown in FIG. 5, a through hole K may be formed in the display area AA of the display apparatus for accommodating the function module.

The portion where the first projection overlaps with the second projection may be adapted to the shape of the function module 40, and may be circular, elliptical, polygonal or irregular, etc. In particular, the through hole K formed in the display apparatus may be any shape matching the shape of the function module 40.

Referring to FIGS. 2-4, for a same light L, in the prior arts, based on the inner support structure of the backlight module at the through hole and the assembly gap between the backlight module and the function module, the sidewall surface of the first through hole of the display film module and the function module may have a gap, and the light L may be just emitted and cause a light leakage. However, in the disclosed display apparatus, the backlight module 30 and the function module 40 may be integrally assembled; and the side surface S2 of the function module 40 may form an inner support structure of the backlight module 30. Thus, the gap between the sidewall surface of the first through hole K1 of the display film module 20 and the function module 40 may be smaller than G2. Accordingly, the light L may be blocked by the function module 40; and the light leakage at the through hole may not occur.

In the display apparatus shown in FIGS. 2-5, based on the assembly requirements, certain assembly gaps may still be set between the layers of the backlight member 31 and the function module 40, and between the display film module 20 and the function module 40. The backlight member 31 and the function module 40 may not direct contact; and the display film module 20 and the function module 40 may not direct contact. For illustrative purposes, such assembly gaps are not shown in FIGS. 2-4.

Further, as shown in FIGS. 2-4, the display film module 20 and the backlight module 30 may level with the end portion of the function module 40. However, the position relationship between the display film module 20, the backlight module 30 and the function module are not limited by the present disclosure.

When the disclosed display apparatus is utilized, each layer of the backlight member of the backlight module may all have a through hole; and the backlight member and the function module may be structurally integrated. After the backlight member and the function module are assembled, the second portion of the function module may be disposed in the through hole of the backlight member such that the sidewall surface of the second portion of the function module may form an inner support structure of the inner end surface of the backlight member at the position of the through hole. The display film module of the display apparatus may also have a through hole; and the first portion of the function module may be disposed in the through hole of the display film module. Because an additional inner support structure, such as an adhesive iron frame, etc., may not be required between the backlight member and the function module, the gap between the backlight member and the function module at the position of the through hole may be reduced. Thus, the gap between the display film module and the function module may be reduced. Accordingly, the display film module may be closer to the function module; and the function module may block more light. Thus, the risk of the light leakage at the through hole may be reduced.

Figure 6:
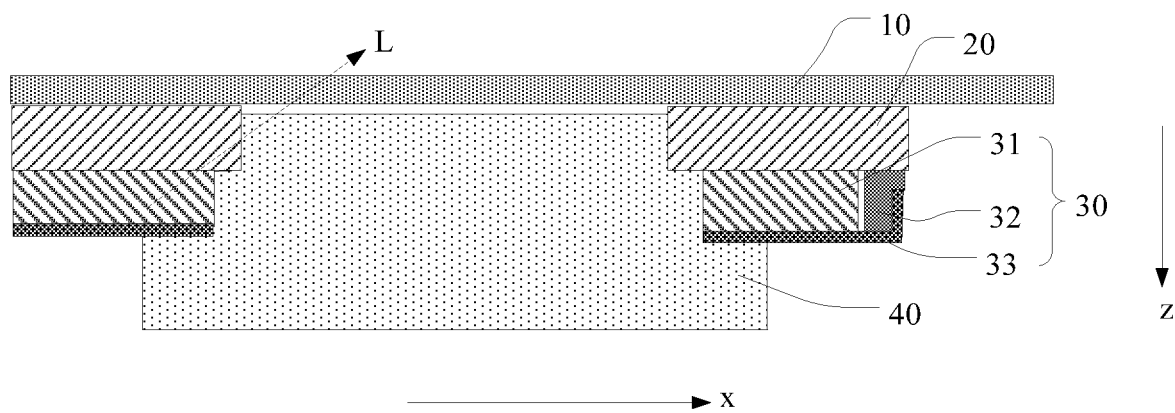
FIG. 6 illustrates a layer structure of another exemplary display apparatus consistent with various disclosed embodiments.
Figure 7:
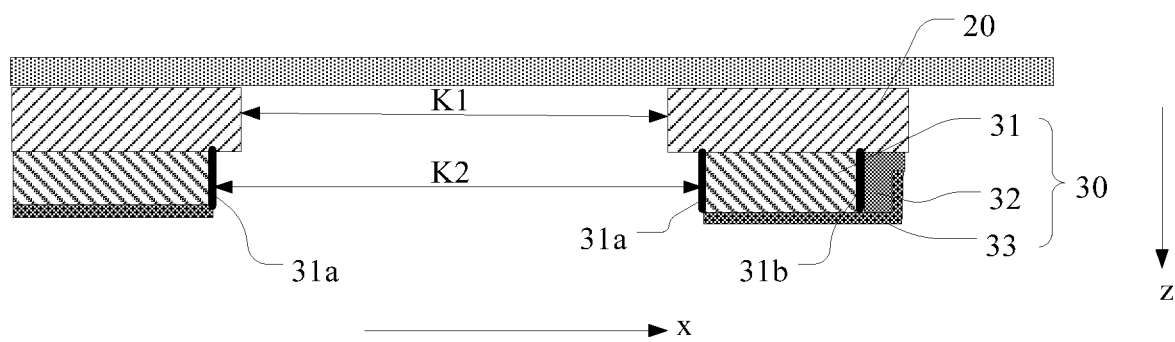
FIG. 7 illustrates a layer structure of another exemplary display apparatus without a function module consistent with various disclosed embodiments.
Figure 8:
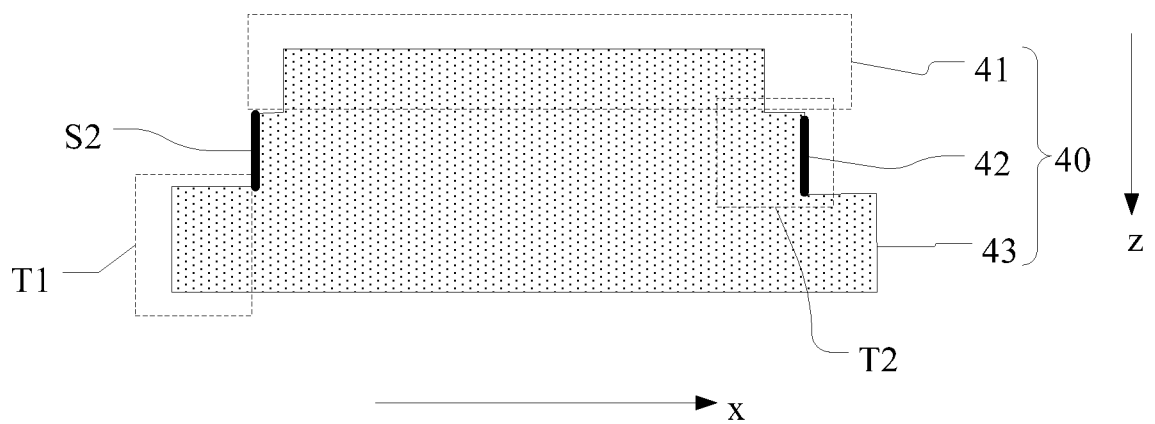
FIG. 8 illustrates a function module of another exemplary display apparatus consistent with various disclosed embodiments.

FIG. 6 illustrates a layer structure of another exemplary display apparatus consistent with various disclosed embodiments. FIG. 7 illustrates a layer structure of another exemplary display apparatus without a function module consistent with various disclosed embodiments. FIG. 8 illustrates a function module of another exemplary display apparatus consistent with various disclosed embodiments.

In one embodiment, as shown in FIGS. 6-8, the display apparatus may include a cover plate 10, a display film module 20, a backlight module 30, and a function module 40. Other detailed structures of the display apparatus may refer to the display apparatus illustrated in FIGS. 2-5.

The through hole of the backlight module 30 may be greater than the through hole of the display film module 20. In particular, the second through hole K2 may be greater than the first through hole K1, and the projection of the first through hole K1 (e.g., a first projection) may be located within the projection of the second through hole K2 (e.g., a second projection). In particular, along the second direction x and at the function module 40, the display film module 20 may protrude from the backlight module 30. For the function module 40, the second portion 42 may extend outwardly relative to the first portion 41 to form a second step T2. The display film module 20 may be disposed on the second step T2.

When the display apparatus illustrated in FIGS. 6-8 is utilized, and when the display film module protrudes from the backlight module at the function module, through the second step of the function module, the function module may be matched with the corresponding positions of the display film module and the backlight module at the function module. Thus, the risk of the light leakage may be further reduced.

Figure 9:
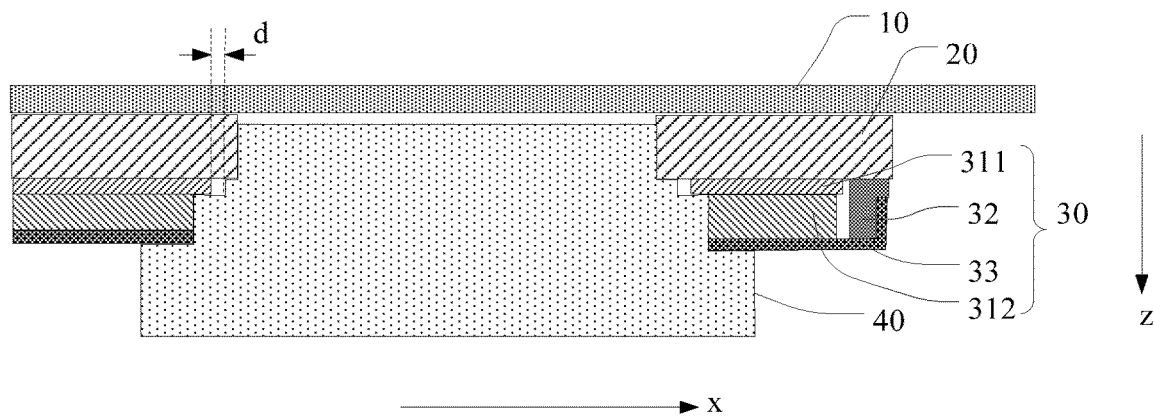
FIG. 9 illustrates a layer structure of another exemplary display apparatus consistent with various disclosed embodiments.
Figure 10:
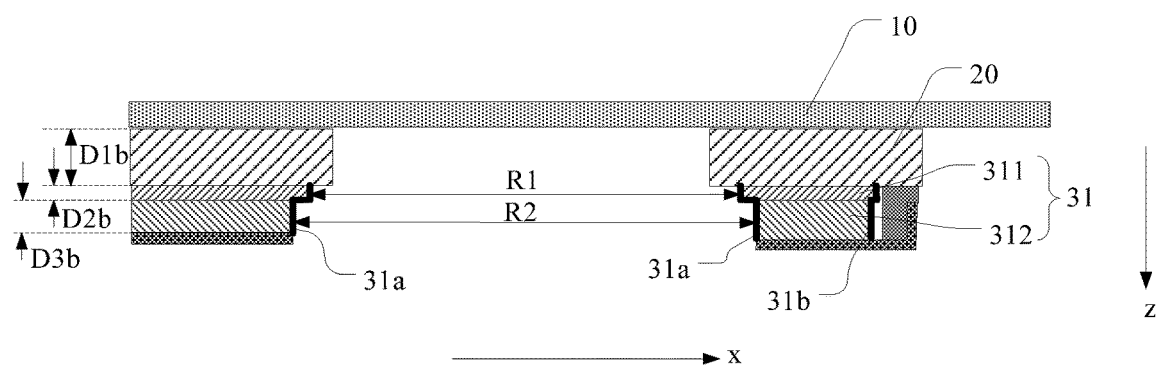
FIG. 10 illustrates a layer structure of another exemplary display apparatus without a function module consistent with various disclosed embodiments.

FIG. 9 illustrates a layer structure of another exemplary display apparatus consistent with various disclosed embodiments; FIG. 10 illustrates a layer structure of another exemplary display apparatus without a function module consistent with various disclosed embodiments; and FIG. 11 illustrates a function module of another exemplary display apparatus consistent with various disclosed embodiments.

Figure 11:
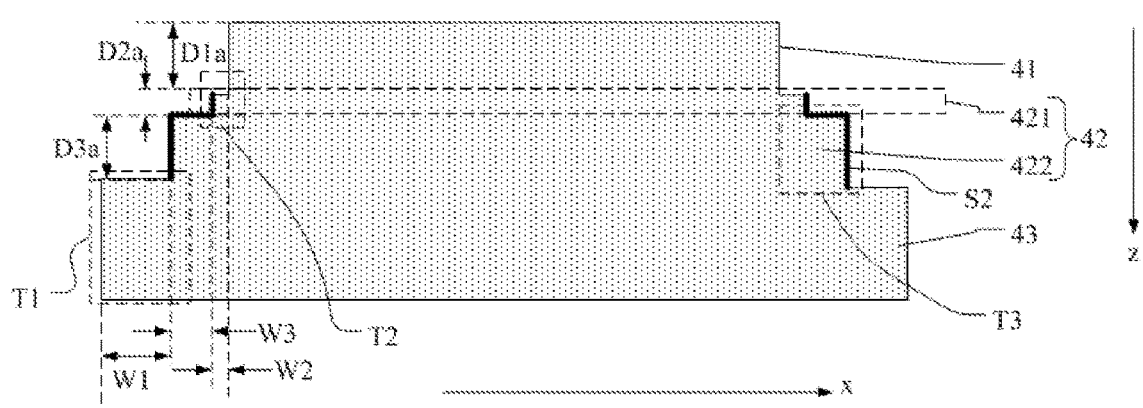
FIG. 11 illustrates a function module of another exemplary display apparatus consistent with various disclosed embodiments.

In one embodiment, as shown in FIG. 9-FIG. 11, the display apparatus may include a cover plate 10, a display film module 20, a backlight module 30, and a function module 40. Other detailed structures of the display apparatus may refer to the display apparatus illustrated in FIGS. 2-5.

As shown in FIGS. 9-11, the backlight module 30 may include a backlight member 31, an outer support structure 32 and a back frame 33. The backlight member 31 may include an optical film group 311 and a light guide plate 312. Along a first direction z, the optical film group 311 may be disposed between the light guide plate 312 and the display film module 20. The second through hole K2 may have a first aperture R1 at the optical film group 311; and the second through hole K2 may have a second aperture R2 at the light guide plate 312. The first aperture R1 may be smaller than the second aperture R2. Along the first direction z, the second portion 42 may have a first sub-portion 421 and a second sub-portion 422. The first sub-portion 421 may be disposed between the second sub-portion 422 and the first portion 41. Along the second direction x, the second sub-portion 422 may extends outwardly relative to the first sub-portion 421 to form a third step T3. Along the second direction x, there may be a gap "d" between the optical film group 311 and the first sub-portion 421.

When the display apparatus illustrated in FIGS. 9-11 is utilized, the through hole of the optical film group may be set to be smaller than the through hole of the light guide plate. In particular, at the function module, the optical film group may protrude from the light guide plate to ensure that the light generated by the light guide plate may pass through the optical film group to be incident on the display film module. Especially when the optical film group is shrunk caused by a lower temperature, the light generated by the light guide plate may be ensured to be incident on the display film module through the optical film group. Through the third step, the function module may be adapted to the relative position between the optical film group and the light guide plate at the functional module. Thus, the gap between the display film module and the function module may be reduced; and the risk of the light leakage at the through hole may be further reduced. Meanwhile, setting the gap between the optical film group and the function module may provide a space for the thermal expansion of the optical film group. Thus, the risk of wrinkles in the optical film group may be reduced.

Further, in one embodiment, referring to FIGS. 9-11, the optical film group 311 may be disposed on the third step T3. When such a display apparatus is utilized, the light guide plate may overlap with the first step; and the optical film group may overlap with the third step; and the display film module may overlap with the second step. Thus, the assembly of the function module with the backlight module and the display film module may be more compact.

Optionally, in one embodiment, referring to FIG. 10 and FIG. 11, along the first direction z, the maximum thickness D1a of the first portion 41 may be smaller than or equal to the thickness D1b of the display film module 20; and the maximum thickness D2a of the first sub-portion 421 may be less than or equal to the thickness D2b of the optical film group 311; and the maximum thickness D3a of the second sub-portion 422 may be smaller than or equal to the thickness D3b of the light guide plate 312.

When such a display apparatus is utilized, the correspondence between the film thickness of the backlight module and the thickness of each part of the function module may be ensured. Thus, the support of the function module to the backlight module may be better realized; and the blacklight module and the function module may be better cooperated to form an integrated structure.

Optionally, in one embodiment, referring to FIG. 10 and FIG. 11, along the first direction z, the thickness D1a of the first portion 41 may be greater than or equal to approximately 0.1 mm, and smaller than or equal to approximately 0.8 mm to be adapted to the thickness of the display film module 20. The thickness D2a of the first sub-portion 421 may be greater than or equal to approximately 0.1 mm and smaller than or equal to approximately 0.3 mm to be adapted to the thickness of the optical film group 311. The thickness D3a of the second sub-portion 422 may be greater than or equal to approximately 0.35 mm and smaller than or equal to approximately 0.7 mm to be adapted to the thickness of the light guide plate 312. When such a display apparatus is utilized, the thickness of each part of the function module may be limited such that the function module may be adapted to a small-sized display apparatus, such as a mobile phone, etc.

Optionally, in one embodiment, referring to FIG. 10 and FIG. 11, along the second direction x, the minimum width W1 of the first step T1 may be greater than or equal to approximately 0.3 mm and smaller than or equal to approximately 2 mm. Thus, the overlapping reliability between the first step T1 and the light guide plate 312 may be ensured. The minimum width W2 of the second step T2 may be greater than or equal to approximately 0.3 mm and smaller than or equal to approximately 1 mm. Thus, the overlapping reliability between the second step T2 and the display film module 20 may be ensured. The minimum width W3 of the third step T3 may be greater than or equal to approximately 0.1 mm and smaller than or equal to approximately 0.5 mm. Thus, the overlapping reliability between the third step T3 and the optical film group 311 may be ensured. At the same time, a pre-set gap "d" may be reserved for the thermal expansion of the optical film group 311.

When such a display apparatus is utilized, the width of each step in the function module may be limited. On the one hand, the reliability for overlapping the corresponding portions with the steps may be improved. On the other hand, the steps may be prevented from being too wide to increase the width of the bezel at the function module.

Figure 12:
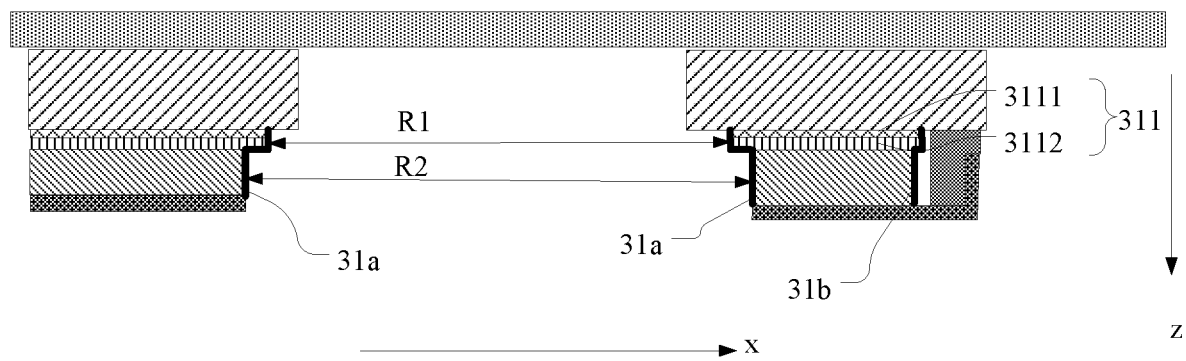
FIG. 12 illustrates a layer structure of another exemplary display apparatus without a function module consistent with various disclosed embodiments.

FIG. 12 illustrates a film structure of another exemplary display apparatus without a function module consistent with various disclosed embodiments. In one embodiment, as shown in FIG. 12, the optical film group 311 may include a brightness-enhancement film 3111 and a diffusion film 3112. Other detailed structures of such a display apparatus may also refer to the display apparatus illustrated in FIGS. 9-11.

Figure 13:
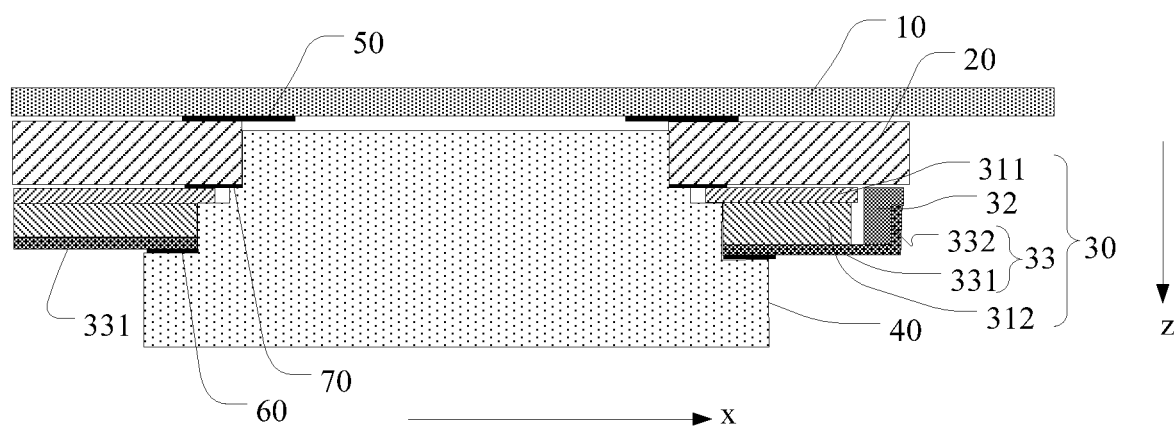
FIG. 13 illustrates a layer structure of another exemplary display apparatus without a function module consistent with various disclosed embodiments.

FIG. 13 illustrates a layer structure of another exemplary display apparatus consistent with various disclosed embodiments. As shown in FIG. 13, the display apparatus may include a cover plate 10, a display film module 20, a backlight module 30, and a function module 40. Other detailed structures of such a display apparatus may refer to the display apparatus illustrated in FIGS. 2-5.

In one embodiment, as shown in FIG. 13, the display apparatus may further include a light-shielding layer 50. Along the first direction z, the light-shielding layer may be disposed between the cover plate 10 and the display film module 20. The projection of the light-shielding layer 50 on the cover plate 10 may be referred to as a third projection.

Figure 14:
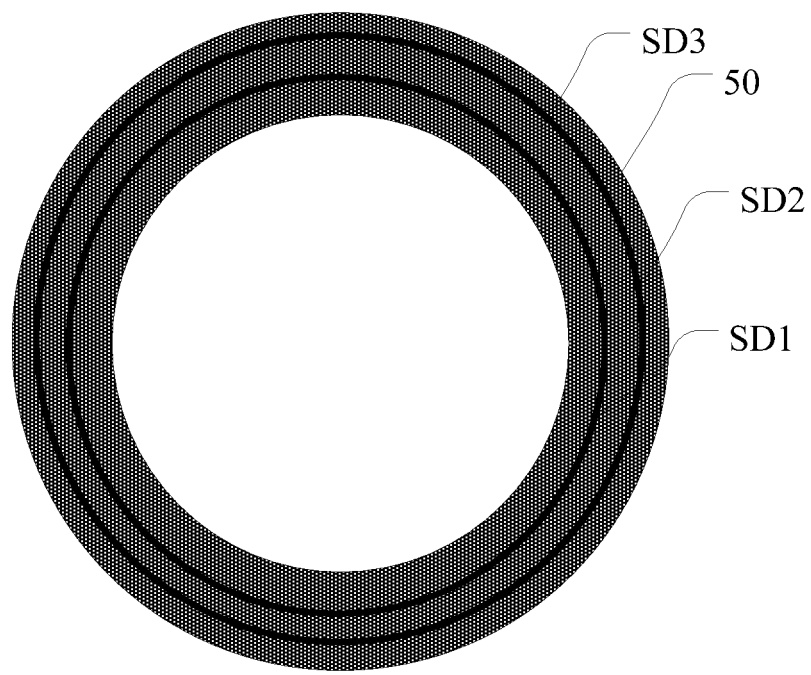
FIG. 14 illustrates a light-shielding layer of an exemplary display apparatus consistent with various disclosed embodiments.

FIG. 14 illustrates a light-shielding layer of an exemplary display apparatus consistent with various disclosed embodiments. As shown in FIG. 14, the third projection SD3 (e.g., the projection of the light-shielding layer on the cover plate 10) is a closed ring structure; and the third projection SD3 may cover the edge SD1 of the first projection (e.g., the projection of the first through hole on the cover plate 10) and the edge SD2 of the second projection (e.g., the projection of the second through hole on the cover plate 10). In particular, the light-shielding layer 50 may cover the edges of the first through hole and the second through hole.

When such a display apparatus is utilized, the light-shielding layer may be disposed between the cover plate and the display film module to further reduce the risk of the light leakage at the through hole. At the same time, the display film module may be closer to the function module. Therefore, it may be possible for the light-shielding layer to cover more area of the function module without providing a substantially wide light-shielding layer. Accordingly, it may contribute to narrowing the bezel at the position of the through hole of the display apparatus. At the same time, the light-shielding layer may cover the through hole of the display film module and the through hole of the backlight module at the same time. Thus, the visibility of the edges of the through holes may be avoided; and the risk of the light leakage may be reduced.

Further, referring to FIG. 13, in one embodiment, the display apparatus may further include a first light-shielding tape 60. Along the first direction z, the first light-shielding tape 60 may be disposed between the backlight module 30 and the first step T1 to prevent the light of the backlight module 30 from oppositely leaking away from the display film module 20. The display apparatus may further include a second light-shielding tape 70. Along the first direction Z, the second light-shielding tape 70 may be disposed between the display film module 20 and the backlight module 30. Further, along the second direction x, the second light-shielding tape 70 may extend from the backlight module 30 to the second step T2 to prevent the light of the backlight module 30 from emitting without passing through the display film module 20.

When such a display apparatus is utilized, a light-shielding tape may be disposed between the backlight module and the first step and between the display film module and the second step, respectively. The light-shielding tapes may not only prevent the light leakage at the edge, but also increase the assembly reliability between the backlight module and the function module, and between the display film module and the function module.

In one embodiment, as shown in FIG. 13, the backlight module 30 may further include an outer support structure 32 and a back frame 33. The outer support structure 32 may surround the outer end surface 31b of the backlight member 31; and the outer support structure 32 may be an adhesive frame. The back frame 33 may include a back plate 331 disposed at a side of the backlight body 31 away from the display film module 20 along the first direction z. The back frame may also include a side plate 332 extending from the back plate 331 to the outer support structure 32 along the first direction z and fixed with outer support structure 32. The back plate 331 may also have a through hole to form a second through hole together with the backlight module 30 and the backlight member 31.

When such a display apparatus is utilized, the outside of the backlight module may be supported by the outer support structure; and the backlight module may be supported by the function module at the inner side of the through hole. Thus, the integrated structure of each film module of the backlight module may be ensured.

The present disclosure also provides an assembly method of a display apparatus. The assembly method may be used to assembly the disclosed display apparatus or other display apparatus.

Figure 15:
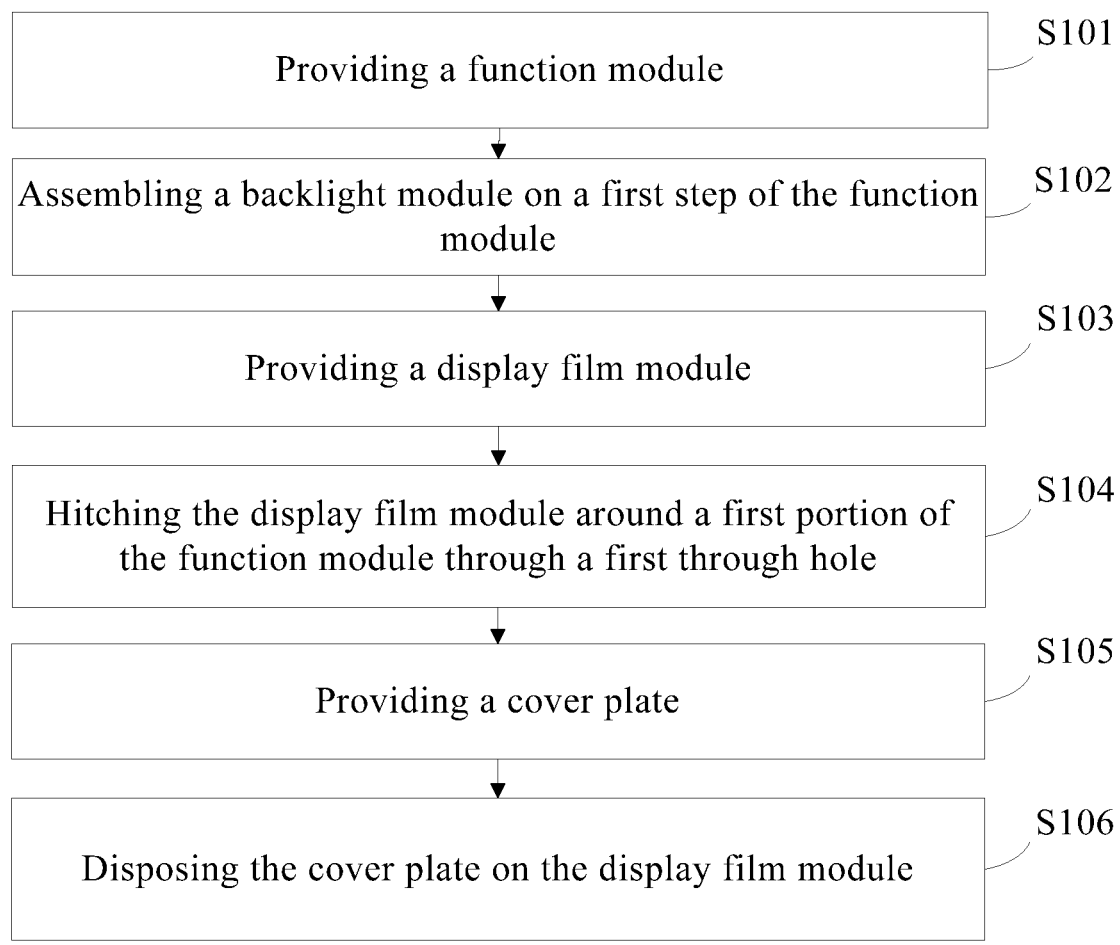
FIG. 15 illustrates a flow chart of an exemplary assembly process of a display apparatus consistent with various disclosed embodiments.
Figure 16:
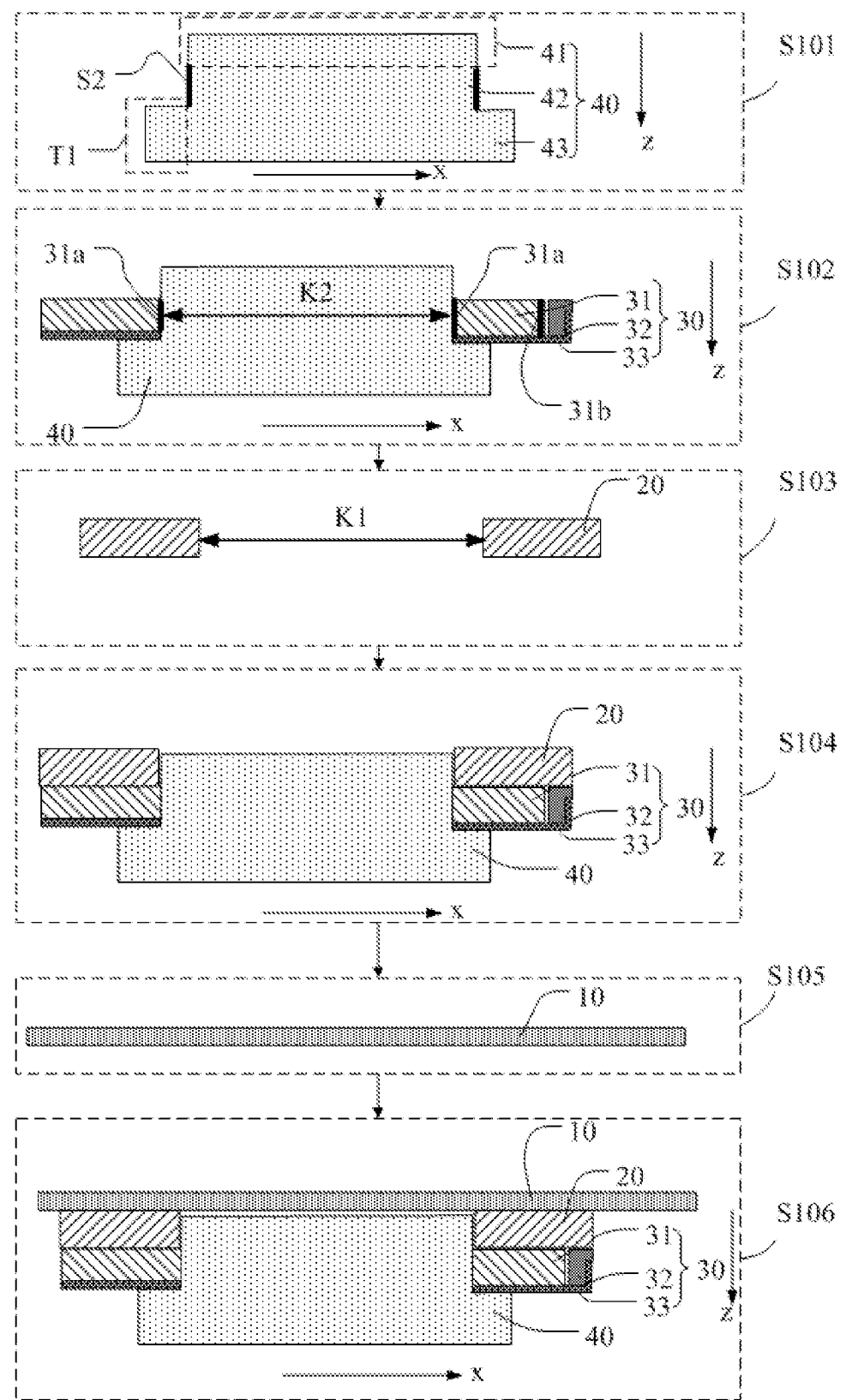
FIG. 16 illustrates structures corresponding to certain stages during an exemplary assembly process of a display apparatus consistent with various disclosed embodiments.

FIG. 15 illustrates a flow chart of an exemplary assembly method of a display apparatus consistent with various disclosed embodiments. FIG. 16 illustrates structures corresponding to certain stages during an exemplary assembly method of a display apparatus consistent with various disclosed embodiments.

As shown in FIG. 15, the assembly method of the display apparatus may include:

Step S101: providing a function module.

As shown in FIG. 16, along a first direction z, a function module 40 may sequentially include a first portion 41, a second portion 42 and a third portion 43. Along a second direction x, the third portion 43 may extend outwardly relative to the second portion 42 to form a first step T1. The second direction x may be perpendicular to the first direction z.

As shown in FIG. 15, the method may also include:

Step S102: providing a backlight module and assembling the backlight module on the first step of the function module.

As shown in FIG. 16, a backlight module 30 may include a backlight member 31. The backlight member 31 may include a plurality of layers. Each of the plurality of layers may have a through hole. Each of the plurality of layers may be respectively hitched around the second portion 42 through its through hole to enable the backlight member 31 to form a second through hole K2 for accommodating the second portion 42. The backlight member 31 may include an inner end surface 31a forming the sidewall surface of the second through hole K2 and an outer end surface 31b away from the second through hole K2. The sidewall surface S2 of the second portion 42 may form an inner support structure surrounding the inner end surface 31a.

The function module 40 may be a camera module, an earpiece module, and/or a sensor module, etc.

As shown in FIG. 15, the assembly method may also include:

Step S103: providing a display film module.

The display film module 20 may have a first through hole K1.

Further, as shown in FIG. 15, the assembly method may include:

Step S104: hitching the display film module around the first portion through the first through hole;

Step S105: providing a cover plate; and

Step S106: disposing the cover plate on the display film module.

As shown in FIG. 16, the cover plate 10 may cover the display film module 20 and the function module 40.

Figure 17:
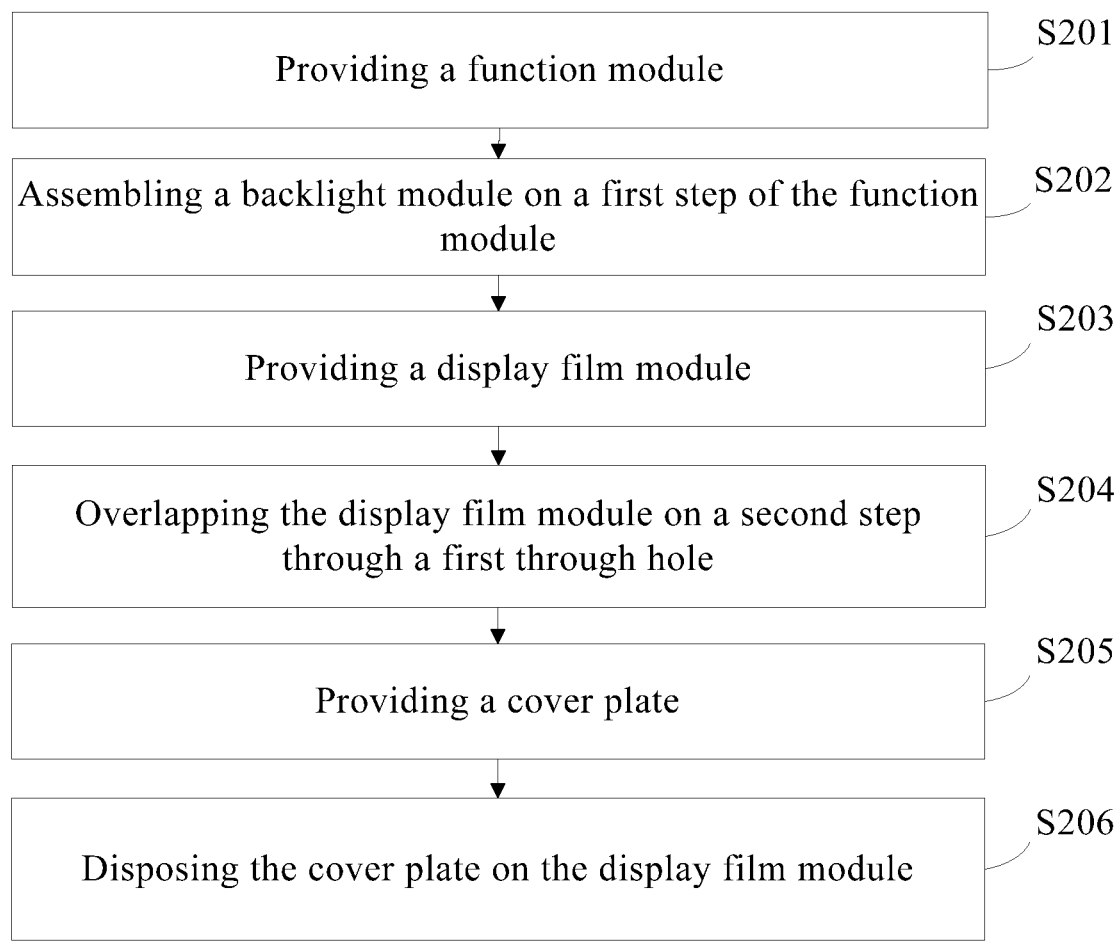
FIG. 17 illustrates a flow chart of another exemplary assembly process of a display apparatus consistent with various disclosed embodiments.
Figure 18:
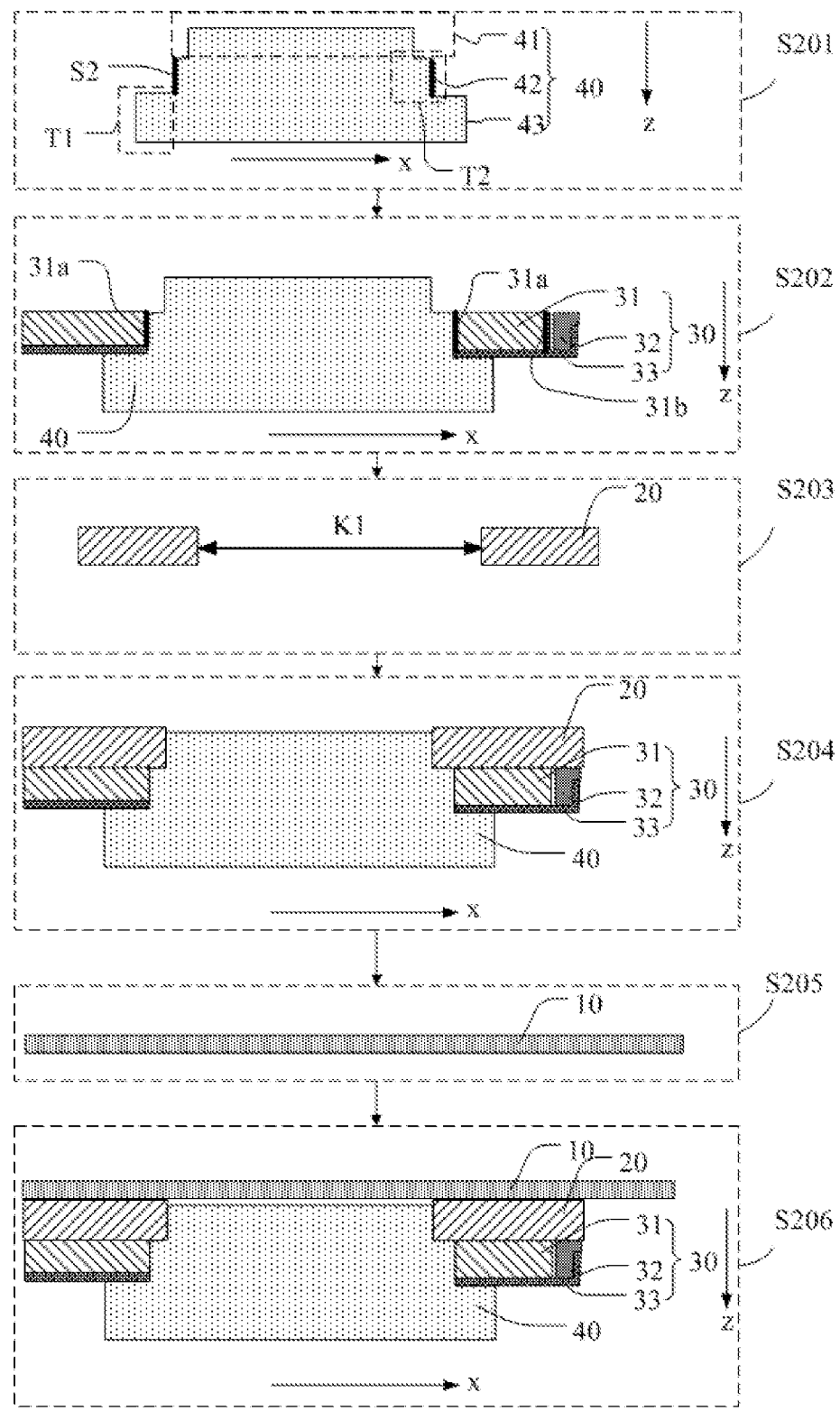
FIG. 18 illustrates structures corresponding to certain stages during another exemplary assembly process of a display apparatus consistent with various disclosed embodiments.

FIG. 17 illustrates a flow chart of another exemplary assembly method of a display apparatus consistent with various disclosed embodiments. FIG. 18 illustrates structures corresponding to certain stages during another exemplary assembly method of a display apparatus consistent with various disclosed embodiments.

In one embodiment, as shown in FIG. 17, the assembly method of the display apparatus may include:

Step S201: providing a function module.

As shown in FIG. 18, along the first direction z, a functional module 40 may sequentially include a first portion 41, a second portion 42 and a third portion 43. Along a second direction x, the third portion 43 may extend outwardly relative to the second portion 42 to form a first step T1; and the second portion 42 may extend outwardly relative to the first portion 41 to form a second step T2. The second direction x may be perpendicular to the first direction z.

As shown in FIG. 17, the assembly method may also include:

Step S202: providing a backlight module and assembling the backlight module on the first step of the function module.

As shown in FIG. 18, the backlight module 30 may include a backlight member 31. The backlight member 31 may include a plurality of layers. Each of the plurality of layers may have a through hole. Each of the layers may be respectively hitched around the second portion 42 through its through hole to enable the backlight member 31 to form a second through hole for accommodating the second portion 42. The backlight member 31 may include an inner end surface 31a forming the sidewall surface of the second through hole and an outer end surface 31b away from the second through hole. The sidewall surface S2 of the second portion 42 may form an inner support structure surrounding the inner end surface 31a.

Further, as shown in FIG. 17, the assembly method may include:

Step S203: providing a display film module.

As shown in FIG. 18, the display film module 20 may have a first through hole K1.

Further, as shown in FIG. 17 and FIG. 18, the assembly method may include:

Step S204: overlapping the display film module on the second step through the first through hole;

Step S205: providing a cover plate; and

Step S206: disposing the cover on the display film module.

As shown in FIG. 18, the cover plate 10 may cover the display film module 20 and the function module 40.

Figure 19:
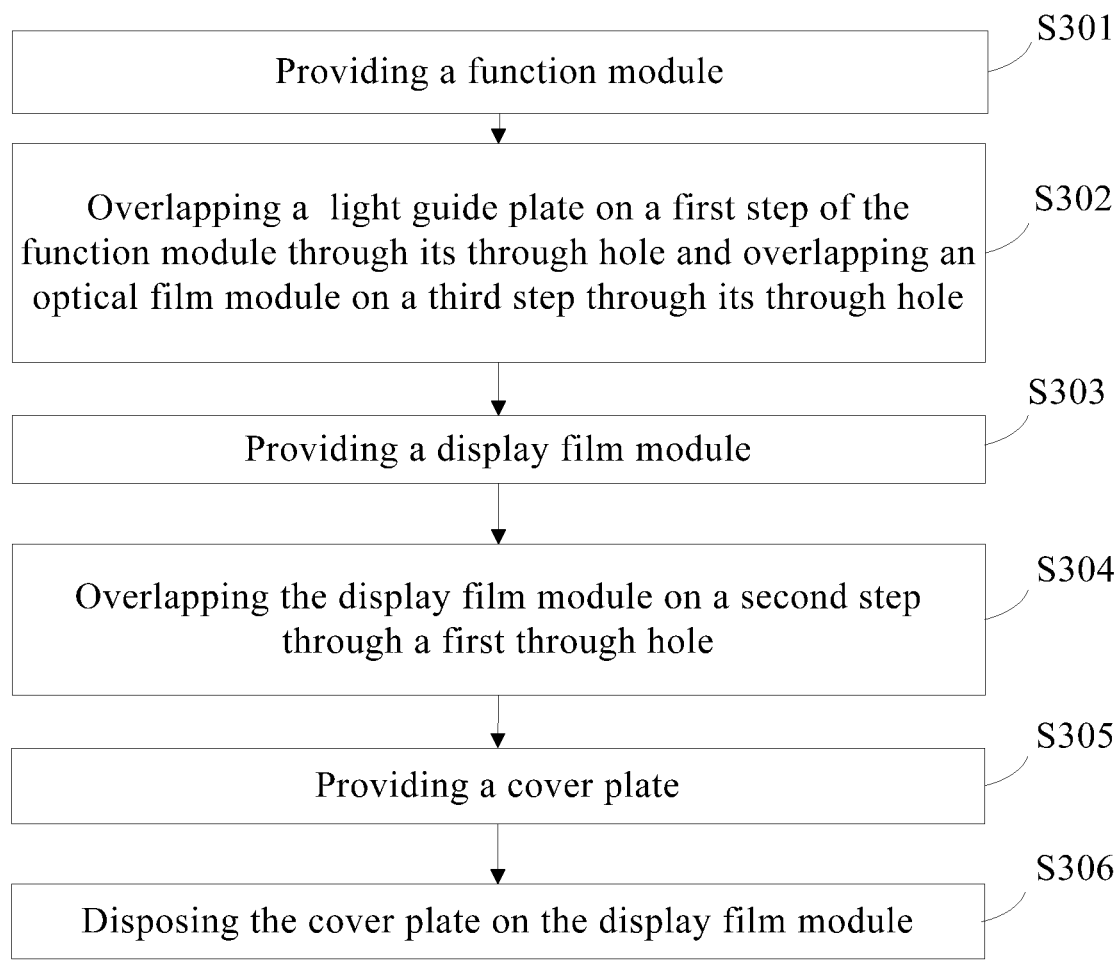
FIG. 19 illustrates a flow chart of another exemplary assembly process of a display apparatus consistent with various disclosed embodiments.
Figure 20:
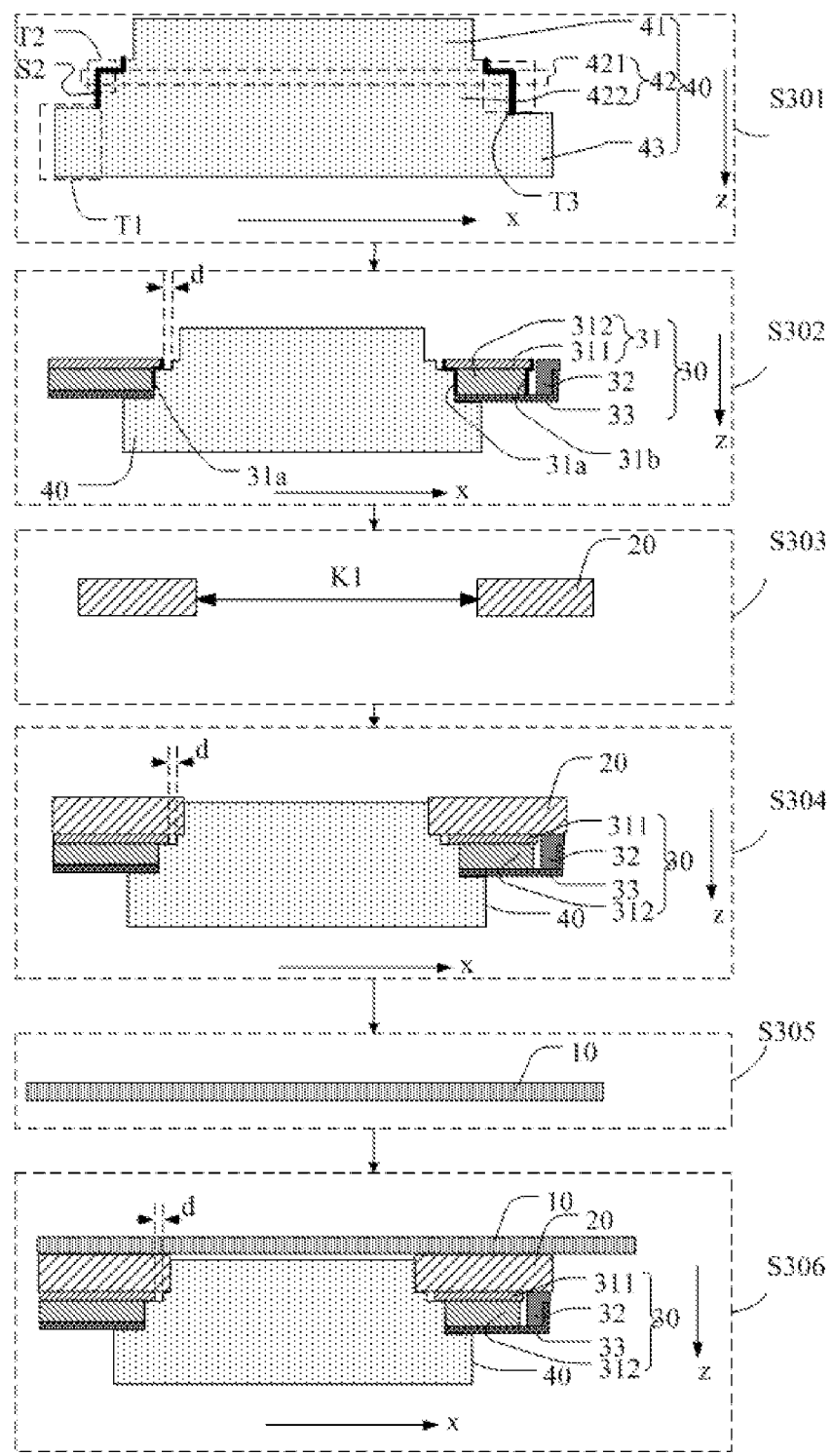
FIG. 20 illustrates structures corresponding to certain stages during another exemplary assembly process of a display apparatus consistent with various disclosed embodiments.

FIG. 19 illustrates a flow chart of another exemplary assembly method of a display apparatus consistent with various disclosed embodiments. FIG. 20 illustrates structures corresponding to certain stages during another exemplary assembly method of a display apparatus consistent with various disclosed embodiments.

As shown in FIG. 19, the assembly method of the display device may include:

Step S301: providing a function module.

As shown in FIG. 20, along the first direction z, the function module 40 may sequentially include a first portion 41, a second portion 42 and a third portion 43. Along the second direction x, the third portion 43 may extend outwardly relative to the second portion 42 to form a first step T1; and the second portion 42 may extend outwardly relative to the first portion 41 to form a second step T2. Along the first direction z, the second portion 42 may include a first sub-portion 421 and a second sub-portion 422. The first sub-portion 421 may be disposed between the second sub-portion 422 and the first portion 41. Along the second direction x, the second sub-portion 422 may extend outwardly relative to the first sub-portion 421 to form a third step T3. The second direction x may be perpendicular to the first direction z.

Further, as shown in FIG. 19, the assembly method may also include:

Step S302: overlapping a light guide plate on the first step through its through hole; and overlapping the optical film group on the third step through its through hole.

As shown in FIG. 20, the backlight module 30 may include a backlight member 31. The backlight member 31 may include a plurality of layers. The plurality of layers may include an optical film group 311 and a light guide plate 312. The aperture of the through hole of the optical film group 311 may be smaller than the aperture of the through hole of the light guide plate 312. Each of the plurality of layers may have a through hole, and each of the film layers may be hitched around the second portion 42 through its through hole to enable the backlight member 31 to form a second through hole for accommodating the second portion 42. The backlight member 31 may include an inner end surface 31*a* forming the sidewall surface of the second through hole and the outer end surface 31*b* away from the second through hole. The side surface S2 of the second portion 42 may form an inner support structure surrounding the inner end surface 31*a*. Along the second direction x, a gap "d" may be formed between the optical film group 311 and the first sub-portion 421.

Further, as shown in FIG. 19, the assembly method may include:

Step S303: providing a display film module.

As shown in FIG. 20, the display film module 20 may have a first through hole K1.

Further, as shown in FIG. 19 and FIG. 20, the assembly method may include:

Step S304: overlapping the display film module on the second step T2 through the first through hole;

Step S305: providing a cover plate; and

Step S306: disposing the cover plate on the display film module.

As shown in FIG. 20, the cover plate 10 may cover the display film module 20 and the function module 40.

Figure 21:
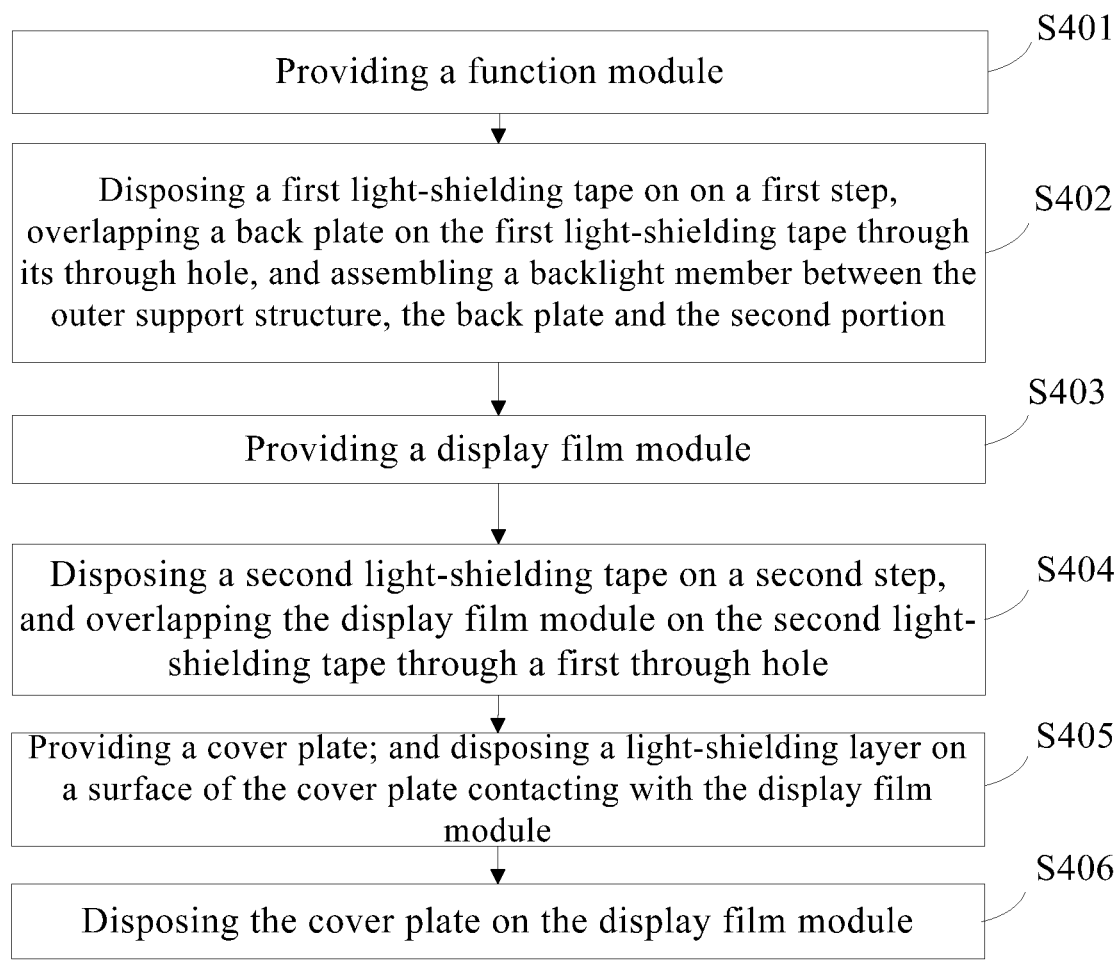
FIG. 21 illustrates a flow chart of another exemplary assembly process of a display apparatus consistent with various disclosed embodiments.
Figure 22:
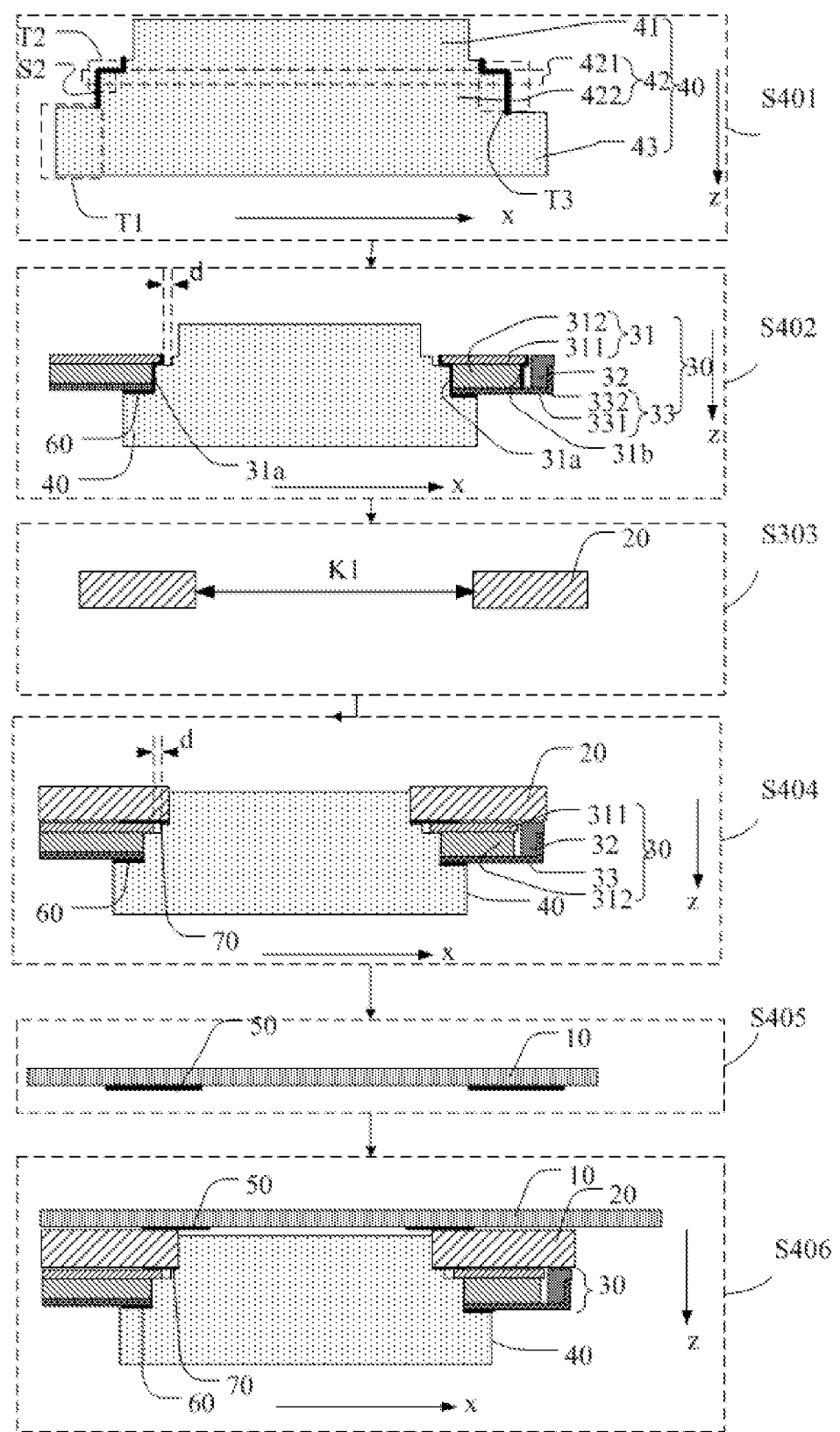
FIG. 22 illustrates structures corresponding to certain stages during another exemplary assembly process of a display apparatus consistent with various disclosed embodiments.

FIG. 21 illustrates a flow chart of another exemplary assembly method of a display apparatus consistent with various disclosed embodiments. FIG. 22 illustrates structures corresponding to certain stages during another exemplary assembly method of a display apparatus consistent with various disclosed embodiments.

In one embodiment, as shown in FIG. 21, the assembly method of the display apparatus may include:

Step S401: providing a function module.

As shown in FIG. 22, along a first direction z, a function module 40 may sequentially include a first portion 41, a second portion 42 and a third portion 43. Along a second direction x, the third portion 43 may extend outwardly relative to the second portion 42 to form a first the step T1; and the second portion 42 may extend outwardly relative to the first portion 41 to form a second step T2. Along the first direction z, the second portion 42 may include a first sub-portion 421 and a second sub-portion 422; and the first sub-portion 421 may be disposed between the second sub-portion 422 and the first portion 41. Along the second direction x, the second sub-portion 422 may extend outwardly relative to the first sub-portion 421 to form a third step T3. The second direction x may be perpendicular to the first direction z.

Further, as shown in FIG. 21, the assembly method may include:

Step S402: disposing a first light-shielding tape on the first step to overlap a back plate on the first light-shielding tape through its through hole on the back plate and assembling the backlight member on an outer support structure and between the back plate and the second portion.

As shown in FIG. 22, the backlight module 30 may include an outer support structure 32 and a back frame 33. The back frame 33 may include a back plate 331 and a side plate 332 extending from the back plate 331 along the first direction z. The outer support structure 32 may be located at the edge of the back plate 331 and fixed with the side plate 332. The back plate 331 may be parallel to the second direction x; and the back plate 331 may have a through hole. The backlight module 30 may further include a backlight member 31; and the backlight member 31 may include a plurality of layers including an optical film group 311 and a light guide plate 312. Each of the plurality of layers may include a through hole; and each of the layers may be hitched around the second portion 42 through its through hole to enable the backlight member 31 to form a second through hole for accommodating the second portion 42. The backlight member 31 may include an inner end surface 31*a* forming the sidewall surface of the second through hole and an outer end surface 31*b* away from the second through hole. The side surface S2 of the second portion 42 may form an inner support structure surrounding the inner end surface 31*a*.

Further, as shown in FIG. 21, the assembly method may include:

Step S403: providing a display film module.

As shown in FIG. 22, a display film module 20 may have a first through hole K1.

Further, as shown in FIG. 21, the assembly method may include:

Step S404: disposing a second light-shielding tape extending from the second step to the backlight module on the second step, and overlapping the display film module on the second light-shielding tape through the first through hole;

Step S405: providing a cover plate and disposing a light-shielding layer on a surface of the cover plate that is in contact with the display film module; and Step S406: disposing the cover plate on the display film module.

As shown in FIG. 20, the cover plate 10 may cover the display film module 20 and the function module 40. After the cover plate 10 is disposed on the display film module 20, the projection of a light-shielding layer 50 on the cover plate 10 may be referred to as a third projection; and the orthographic projection of the first through hole K1 on the cover plate 10 may be referred to as a first projection; and the orthographic projection of the second through hole on the cover plate 10 may be referred to as a second projection. The third projection may be a closed loop; and the third projection may cover the edge of the first projection and the edge of the second projection. The light-shielding layer may be an ink layer, etc.

In some embodiment, referring to FIG. 22, the assembly method may also include disposing a first light-shielding tape 60 and a second light-shielding tape 70.

Some other detailed structures and intermediate structures corresponding to certain stages during the above described assembly methods may be referred to the descriptions of the display apparatus.

The present disclosed display apparatus and assembly method may achieve at least the following beneficial effects.

Each layer of the backlight member in the backlight module may have a through hole, and the backlight member and the function module may be structurally integrated. After the backlight member and the function module are assembled, the second portion of the function module may be disposed in the through hole of the backlight member. The side surface of the second portion of the function module may form an inner support structure of the inner end surface of the backlight member at the position of the through hole. The display film module of the display apparatus may also have a through hole, and the first portion of the function module may be disposed in the through hole of the display film module. Because it may not need to additionally provide an inner support structure, such as a rubber iron frame, etc., between the backlight member and the function module, the gap between the backlight body and the function module at the position of the through hole may be reduced. Thus, the gap between the display film module and the function module may be reduced. Accordingly, the display film module may be closer to the function module, and the function module may be able to block more light, and the risk of the light leakage at the through hole may be reduced.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display apparatus, comprising:
   a cover plate;
   a display film module, along a first direction, disposed on one side of the cover plate and containing a first through hole;
   a backlight module, disposed on a side of the display film module away from the cover plate, wherein the backlight module includes a backlight member, the backlight member contains a second through hole, the backlight member includes an inner end surface that forms a sidewall surface of the second through hole and an outer end surface away from the second through hole, and an orthogonal projection of the first through hole on the cover plate is referred to as a first projection and an orthogonal projection of the second through hole on the cover plate is referred to as a second projection, and the first projection is at least partially overlaps with the second projection; and
   a function module, wherein, along the first direction, the function module sequentially includes a first portion disposed in the first through hole, a second portion disposed in the second through hole and a third portion, and along a second direction substantially perpendicular to the first direction, the third portion extends outwardly relative to the second portion to form a first step, the backlight member is disposed on the first step, and a sidewall surface of the second portion adapts to the inner end surface to form an inner support structure surrounding the inner end surface.

2. The display apparatus according to claim 1, wherein:
   the first projection is located within the second projection;
   along the second direction, the second portion extends outwardly relative to the first portion to form a second step; and
   the display film module is disposed on the second step.

3. The display apparatus according to claim 1, wherein:
   the backlight member includes an optical film group and a light guide plate;
   along the first direction, the optical film group is disposed between the light guide plate and the display film module;
   the second through hole has a first aperture at the optical film group;
   the second through hold has a second aperture at the light guide plate;
   the first aperture is smaller than the second aperture;
   along the first direction, the second portion includes a first sub-portion and a second sub-portion;
   the first sub-portion is disposed between the second sub-portion and the first portion;
   along the second direction, the second sub-portion extends outwardly relative to the first sub-portion to form a third step; and
   along the second direction, a gap is formed between the optical film group and the first sub-portion.

4. The display apparatus according to claim 3, wherein:
   the optical film group is disposed on the third step.

5. The display apparatus according to claim 3, wherein:
   the optical film group includes a light-enhancement layer and a diffusion layer.

6. The display apparatus according to claim 3, wherein along the first direction:
   a maximum thickness of the first portion is greater than or equal to a thickness of the display film module;
   a maximum thickness of the first sub-portion is greater than or equal to a thickness of the optical film group; and
   a maximum thickness of the second sub-portion is greater than a thickness of the light guide plate.

7. The display apparatus according to claim 6, wherein along the first direction:
   a thickness of the first portion is greater than or equal to approximately 0.1 mm and smaller than or equal to approximately 0.8 mm;
   a thickness of the first sub-portion is greater than or equal to approximately 0.1 mm and smaller than or equal to approximately 0.3 mm; and
   a thickness of the second sub-portion is greater than or equal to approximately 0.35 mm and smaller than or equal to approximately 0.7 mm.

8. The display apparatus according to claim 3, wherein along the second direction:
   a thickness of the first step is greater than or equal to approximately 0.3 mm and smaller than or equal to approximately 2 mm;
   a thickness of the second step is greater than or equal to approximately 0.3 mm and smaller than or equal to approximately 1 mm; and
   a thickness of the third step is greater than or equal to approximately 0.1 mm and smaller than or equal to approximately 0.5 mm.

9. The display apparatus according to claim 1, further comprising:
   a light-shielding layer, along the first direction, disposed between the cover plate and the display film module, wherein:
   a projection of the light-shielding layer on the cover plate is referred to as a third projection;
   the third projection is a closed ring; and
   the third projection covers an edge of the second projection and an edge of the second projection.

10. The display apparatus according to claim 2, further comprising:
    a first light-shielding tape, along the first direction, disposed between the backlight module and the first step; and
    a second light-shielding tape, along the first direction, disposed between the display film module and the backlight module and, along the second direction, extending from the backlight module to the second step.

11. The display apparatus according to claim 1, wherein:
    the backlight module also includes an outer support structure and a back frame;
    the outer support structure surrounds the outer end surface of the backlight member; and
    the back frame includes a back plate disposed at a side of the backlight member away from the display film module along the first direction and a side plate extending from the back plate to the outer support structure and being fixed with the outer support structure.

12. The display apparatus according to claim 1, wherein: the function module includes at least one of a camera module, an earpiece module and a sensor module.

13. The display apparatus according to claim 1, wherein: an overlap portion between the first projection and the second projection is one of circle, an eclipse, a polygon and an irregular shape.

14. An assembly method of a display apparatus, comprising:
providing a function module, wherein, along a first direction, the function module sequentially includes a first portion, a second portion and a third portion, and along a second direction substantially perpendicular to the first direction, the third portion extends outwardly to form a first step;
assembling a backlight module on the first step of the function module, wherein the backlight module includes a backlight member, the backlight member includes a plurality of layers, each of the plurality of layers includes a through hole, each layer hitches around the second portion through its through hole to enable the backlight member to form a second through hole for accommodating the second portion, the backlight member includes an inner end surface that forms a sidewall surface of the second through hole and an outer end surface away from the second through hole, and a sidewall surface of the second portion forms an inner support structure surrounding the inner end surface;
providing a display film module having a first through hole;
hitching the display film module around the first portion through the first through hole;
providing a cover plate; and
disposing the cover plate on the display film module to cover the display film module and the function module.

15. The assembly method according to claim 14, wherein:
along the second direction, the second portion extends outwardly relative to the first portion to form a second step; and
hitching the display film module around the first portion through the first through hole includes overlapping the display film module on the second step through the first through hole.

16. The assembly method according to claim 14, wherein:
the plurality of layers include an optical film group and a light guide plate;
an aperture of a through hole of the optical film group is smaller than an aperture of a through hole of the light guide plate;
along the first direction, the second portion includes a first sub-portion and a second sub-portion;

the first sub-portion is disposed between the second sub-portion and the first portion;
along the second direction, the second sub-portion extends outwardly relative to the first sub-portion to form a third step;
assembling the backlight module on the first step of the function module includes overlapping the light guide plate on the first step through its through hole and overlapping the optical film group on the third step through its through hole; and
along the second direction, a gap is formed between the optical film group and the first sub-portion.

17. The assembly method according to claim 14, wherein:
the backlight module further includes an outer support structure and a back frame;
the back frame includes a back plate and a side plate extending from the back plate along the first direction;
the outer support structure is disposed at an edge of the back plate and fixed with side plate;
the back plate is parallel to the second direction;
the back plate contains a through hole; and
assembling the backlight module on the first step of the function module includes overlapping the back plate on the first step through its through hole and assembling the backlight member between the outer support structure and the second portion.

18. The assembly method according to claim 14, after providing the cover plate and before disposing the cover plate on the display film module further comprising:
disposing a light-shielding layer on a surface of the cover plate at a side contacting with the display film module,
wherein a projection of the light-shielding layer on the cover plate is referred to as a third projection, an orthogonal projection of the first through hole on the cover plate is referred to as a first projection, an orthogonal protection of the second through hole on the cover plate is referred to as a third projection, the third projection is a closed loop, and the third projection covers an edge of the first process and an edge of the second projection.

19. The assembly method according to claim 14, further comprising:
disposing a first light-shielding tape on the first step before assembling the backlight module on the first step of the function module; and
disposing a second light-shielding tape on the second step before hitching the display film module around the first portion and after assembling the backlight module on the first step of the function module,
wherein the second light-shielding tape extends from the second step to the backlight module.

20. The assembly method according to claim 14, wherein:
the function module includes at least one of a camera module, an earpiece module and a sensor module.

* * * * *